United States Patent [19]

Clingerman et al.

[11] Patent Number: 4,752,229

[45] Date of Patent: Jun. 21, 1988

[54] FISH HEADS FOR TAXIDERMY AND METHODS OF PREPARING SAME

[75] Inventors: Larry B. Clingerman, North Rose; Victor M. Franco, Jr., Oswego, both of N.Y.

[73] Assignee: Tru-Form Fish Heads, North Rose, N.Y.

[21] Appl. No.: 923,479

[22] Filed: Oct. 27, 1986

[51] Int. Cl.$^4$ ............... B29C 33/40; B29C 39/02; G09B 23/00

[52] U.S. Cl. ................... 434/296; 264/222; 264/225; 264/226; 264/227; 264/DIG. 30; 428/15; 428/16; 428/542.4; 434/295

[58] Field of Search ........... 264/222, 225, 226, 227, 264/334, 336, 337, 338, DIG. 30; 156/61; 427/4; 428/15, 16, 542.2, 542.4; 434/295, 296, 297

[56] References Cited

U.S. PATENT DOCUMENTS

| | | | |
|---|---|---|---|
| 803,004 | 10/1905 | Mayer | 264/222 |
| 3,548,528 | 12/1970 | Belokin, Jr. | 428/16 X |
| 4,108,955 | 8/1978 | Thom | 264/222 |
| 4,335,067 | 6/1982 | Castanis et al. | 264/222 |
| 4,596,683 | 6/1986 | Powell | 264/46.4 |

*Primary Examiner*—Jeffery Thurlow
*Assistant Examiner*—Leo B. Tentoni
*Attorney, Agent, or Firm*—Robert M. Phipps

[57] ABSTRACT

Accurate heads are prepared by molding processes for the use by taxidermists in preparing fish for permanent display. The heads are removed from the silicone rubber mold just after the molding composition has achieved its peak exotherm and becomes very firm.

8 Claims, No Drawings

FISH HEADS FOR TAXIDERMY AND METHODS OF PREPARING SAME

BACKGROUND

1. Field of Invention

This invention relates to fish heads for taxidermy purposes and a method of preparing same.

2. Prior Art

Presently fish are prepared for mounting and display by scraping away of the fish meat from the skin while leaving the head and skull attached to the skin. Much of the cheek meat is removed through the eye socket opening. This indirect cleaning of the head often results in leaving some of the meat and/or fatty tissue in the head structure. This, in turn, results in undesirable decay and odor. Additionally, the stability of the mounted fish is put in question. The thus prepared scrapped skin and head is then, on the inside, covered with adhesive, mounted on a body form and sewed together on the back side. Thereafter the exterior of the fish is cosmetically prepared for display.

It is an object of this invention to provide a lifelike, ready to use, replica of a fish head free of fish parts which decay, to use in the taxidermy of fish. Another object is to provide an easily carried out method of preparing acceptable replica fish heads. Still other objects will be apparent to those skilled in the art upon reference to the following detailed description.

SUMMARY OF THE INVENTION

In accordance with this invention there is provided a process for preparing quantities of a realistic artificial fish head for taxidermy purposes comprising A. To the surface of a previously prepared room temperature vulcanizing silicone rubber composition mold for fish heads, said mold being prepared by
  (a) inserting into a container containing a room temperature vulcanizable silicone rubber composition a fish head master for such a depth that at least the entire length of said fish head is below the surface of said composition,
  (b) polymerizing said composition, and
  (c) removing said fish head to obtain a permanent mold for molding fish heads
    Applying a thin coating of a catalyzed cross linkable liquid polymer and allowing it to solidify, said catalyst being present in an amount sufficient to achieve rapid crosslinkinig of all the polymer,
B. Applying a layer of said cross linkable liquid polymer containing strands of fiber glass and embedding within this layer a wire handle for removal of fish head being prepared, and
C. While said mold still contains a substantial amount of the heat generated by said crosslinking removing the resulting fish head from said mold.
    Additionally provided is a method of preparing a singular specimen fish head. Also provided are taxidermically prepared fish wherein the fish head is prepared by the foregoing processes. The artificial glass fish eyes can be attached either as a part of the molding process or afterwards to the molded fish head.

DESCRIPTION OF THE PREFERRED EMBODIMENTS

The fish heads of this invention are prepared with compositions generally known as fiber glass compositions or more particularly as fiber glass filed resin (or polymeric) compositions. The fish heads being cast replicas of actual fish caught have all the features of the fish head, including and natural openings. At the same time, the cast heads are free of fish oils and meats which eventually decompose, lessening the value of the taxidermist's work.

The process for preparing the fish heads of this invention consist of preparing a master fish head die, preparing the mold and finally preparing the replica fish head. This process provides for the manufacture of numerous replicas from the same mold as well as providing a simple method for preparing a single replica of a particularly prized catch. In either event the head of the fish to be replicated, while still attached to the fish's body, is cleaned of surface dirt. The cleaned head and immediately adjacent body is inserted into a container of alginate molding composition. Once the alginate hardens to form a negative of the fish head, the fish head is removed.

Using the temporary alginate composition negative mold, a master positive or die is prepared by well known fiber glass/resin techniques. First a thin layer of resin is applied to the mold's surface followed by layer(s) of fiber glass saturated with resin. A metal hanger, as desired, may be anchored in the fiber glass mat to facilitate subsequent handling of the positive. The resin mixture is allowed to polymerize. The positive is then freed of the alginate composition, cleaned and any artistically undesirable features of the positive corrected.

The permanent mold is prepared from a room temperature vulcanizing (RTV) silicone rubber. These compositions are available in one part products which are formulated to vulcanize on contact with moisture from the air and as a two part product in which the curing agent is added to polymer at time of use. The two part or two component RTV silicone rubber is preferred in carrying out the process of this invention. The positive or master die of the fish head is inserted into the uncured or unpolymerized RTV silicone composition. In keeping with usual molding practice, it is preferred to lightly coat the master with a mold release agent prior to insertion of the master in the RTV silicone composition. The composition is then allowed to cure. After polymerization the master die is withdrawn from the just formed mold. This mold has sufficient flexibility that the mold is not destroyed by removal of the master die or subsequent replica fish heads.

The mold is now ready to be used in preparation of the replica fish heads. Glass fish eyes can be affixed to the eye depressions of the mold with temporary adhesive. The eyes preferably have attachment wires affixed on their back side so that the eyes can be mechanically permanently attached to the fish head. Alternatively, the glass eye attachment may be delayed until after the fish has been molded. In such cases the eye insertion step is omitted and the molding proceeds without change. After the fish head is removed from the mold, the desired eyes are attached by the use of adhesive, wire or both as desired depending on the artistic effect sought to be achieved.

Then a mold release is applied to the mold and the now exposed surface of the eyes, if present, a thin coating of the catalyzed resin is then applied over the mold release which is on the surface of the mold and the resin is allowed to solidify. Thereafter one or more layers of fiber glass and catalyzed resin is applied to the mold surface. A metal hanger, as desired, may be anchored in the fiber glass may be anchored in the fiber glass mat to facilitate subsequent handling and permanent attachment of the head to the fish body. While the resulting replica and mold still contain a substantial amount of heat generated by the polymerization, that is shortly after the peak exotherm, the replica is removed from the mold. A simple test for removal time is the tackiness of the inner side of the fish head. When the surface becomes no longer tacky to touch, the fish head should be removed from the mold. If not previously molded in, then the eyes are attached. With additional amounts of the catalyzed resin, preferably containing a white filler such as calcium silicate or calcium carbonate, the teeth are then completed. Thereafter the replica can be painted, polished and the like prior to attaching the fish's skin, as is customary by the trained taxidermist.

The fish head(s) prepared by the processes of this invention are characterized by their extreme detail of head cavity openings, e.g., mouth and gil, as well as projecting parts such as tongue, teeth and the like. Reproductions of these details previously have not been obtainable by previously known casting methods.

The alginates useful in this invention are salts of alginic acids. The typical salts include ammonium alginate, calcium alginate, potassium alginate and sodium alginate. Because of their gum like properties alginates have found wide use. For molding use fillers, wetting agents and the like are admixed with the alginate. A typical alginate molding composition is:

potassium alginate: 12 (wt percent)

calcium sulfate dihydride: 12 trisodium phosphate: 2 diatomaceous earth: balance the alginate compositions lack the strength and durability to be used as a permanent mold, but they do accurately detail the features of the fish head. Thus, the alginate is suitable for use as a mold when preparing either a master die (or positive) or a single specimen head. Alginate molding compositions are commercially available under a number of trademarks such as Jeltrate, Coe Alginate, Kent Alginate, Keyto Alginate, Supergel and Kalginate.

To the dry alginate molding composition is added with mixing sufficient water to obtain a thick pourable consistency. Maximum working time (pot time) of the aqueous alginate mixture is obtained by the use of ice cold water. The most satisfactory molding results are obtained when the alginate composition is prepared for maximum pot life.

Room temperature vulcanizing (RTV) silicone rubbers are of the silicone rubber family. This group of silicone polymers are characterized by the ease which they can be processed. RTVs cure by either a condensation or an addition reaction. In the condensation cure, which can be either one part or a two part system, the basic polymer essentially is a silicone fluid with silanol end groups.

One part products are made by mixing polymer filler, crosslinking agent, and curing catalyst, then packaging the mixture to protect it from moisture. Contact with moist air promotes the reaction which cures the polymer. Time required for cure depends upon temperature, humidity, and thickness of layer. Acetic acid or methyl ethyl ketoxime are typical by-products of the most widely used curing systems. Viscosities which can vary from flowable to thixotropic are controlled by fillers and additives.

Two component products are composed of a polymer mixed with fillers and ethyl silicate. A metal soap curing agent, such as dibutyl tin dilaurate or tin octoate, or an diisocynate is stirred in just before using the material. Curing begins at once with the elimination of ethyl alcohol.

Polymerization can also be based on crosslinking which results from the reaction of a vinyl containing gum with a siloxane containing Si-H, in the presence of a transition metal catalyst. This type of reaction may be carried out at room or elevated temperatures.

These products normally are sold as two package RTVs; however, one package systems with special inhibitors presently are available.

Two part systems are used for potting, encapsulating, and embedding electrical and electronic devices, circuits, or systems, also for mold making, particularly in the furniture industry.

The liquid polymer or resin used to prepare the resin/fiber glass master or positive die, as well as the replica fish heads, are well known in the art. Typically, these liquid polymers or resins are polymers and copolymers of epoxy and or polyesters.

Typical epoxy resins include diglycidyl ether of bisphenol A and its higher homologs as well as various modifications thereof. Another useful class is the novolac epoxy resins. These epoxies are produced by first producing a novolac resin, which usually is formed by reacting phenol or substituted phenols with formaldehyde which is subsequently reacted with epichlorohydrin to form the epoxy resin. Alicyclic epoxy resin also is produced by reacting hydrogenated bisphenol acetone with epichlorohydrin. Epoxy resins are also produced from cycloaliphatics such as cyclopentadiene via peracetic acid oxidation. Epoxy resins can also be produced from many kinds of polyolefinic compounds such as unsaturated animal and vegetable oils, polyethers, polyesters, and butadiene derivatives.

The unsaturated polyesters useful in the invention are generally those known in the art, and generally constitute a reaction product of a polycarboxylic compound and a polyhydric alcohol. By polycarboxylic compounds are meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon to carbon double bonds, and the corresponding acid halides, esters, anhydrides can include maleic, chloromaleic, ethylmaleic, itaconic, citraconic, xeronic, pyrococinchoninic and acetylene dicarboxylic acids, either alone or in mixtures.

Illustrative of the unsaturated polyhydric alcohols having aliphatic carbon to carbon double bonds, which can be used in providing the unsaturation in the linear polyester molecules are compounds such as butenediol, pentenediol, the unsaturated hydroxy ethers such as allyl or vinyl glycerol ethers, allyl or vinyl pentaerythritol ethers and the like.

The properties of the polyesters can be varied by using mixtures of the various types of acids and alcohols, such as an unsaturated acid and a saturated acid with a saturated alcohol.

Since the polyester resins described are frequently solids or viscous liquids, their use in paving applications is enhanced and facilitated by employment with them of a liquid polymerizable monomeric compound which serves as a diluent or solvent for the polyester resins, and which may be readily cured to a solid by copolymerization with the polymerizable components of the polyester. Such monomers are characterized by their possession of at least one olefinic bond, i.e., a C=C linkage.

Suitable monomers include such well known materials as styrene, vinyl toluene, diallyl phthalate, divinyl benzene, alpha-methyl styrene, methyl methacrylate and triallyl cyanurate. The monomer component may be conveniently employed in amounts up to about 70 percent by weight, preferably about 5 to about 50 percent of the combined styrene polyester resin composition. By virtue of the polymerization of the monomer with the unsaturated components of the polyester, a desirable rigidity and homogeneity may be added to the entire composition.

This polymerization or cure is conveniently achieved under the influence of a peroxide catalyst. However, any catalyst capable of initiating vinylic crosslinking, such as peracids and azo catalyst, e.g., azobis isobutyronitrile, are suitable. The curing reaction itself is exothermic and the heat thus evolved aids in speeding the cure. As catalysts or curing agents, organic peroxides give the best results in the composition, since they are inexpensive and may be easily added to the polyester monomer mixture to give cures at room temperatures or slightly above. Examples of such catalysts include cumene hydroperoxide, benzoyl peroxide, ditert-butyl peroxide, lauroyl peroxide, and ketone peroxides such as methyl ethyl ketone peroxide, methyl vinyl ketone peroxide, mesityl oxide peroxide, and the like.

These curing agents may be added to the composition in their pure form, or they may be added in solution in such inert organic solvents as the phthalate esters, including dimethyl and dioctyl phthalate and as well as the cresyl phosphate esters. The concentration in which the curatives are used ranges from 0.01 percent by weight of the unsaturated polymer composition to about 10 percent by weight, while the preferred range is between about 0.1 percent and about 5 percent by weight of the unsaturated polyester resin.

In addition to the curing agents, driers or accelerators may be used to promote the curing of the compositions of the invention under the conditions of use. In general, these driers include metal salts of organic acids (metal soaps), amines such as dibutyl amine and mercaptans such as dodecyl mercaptan. These accelerators include the cobalt, lead, manganese, calcium, zinc and iron soaps of organic acids. Preferred organic acids from which the metal soaps are prepared include naphthenic acid, octoic acid, stearic acid and lauric acid. Of these accelerators, the most preferred is cobalt naphthenate because of its better solubility and activity. Quantities of these accelerators which are used in the composition of the invention will depend, of course, on the nature of the polyester, peroxide curing agent and accelerator used, but in general amounts of accelerator between about 0.02 percent and 10 percent by weight, based on the polymer composition, have proved useful.

The following examples illustrate the preparation of the replica fish heads and their use in the present invention. However, they are not to be considered limiting the scope of the present invention.

A temporary mold for preparing the master fish head die is first prepared. To a quantity of potassium alginate molding compound, available under the trademark Jeltrate, in a cylindrical container is added sufficient ice cold water to obtain a mixture having a thick but pourable consistency. The head of the trout fish to be replicated is inserted into the container until the fish's head is submerged. The fish is then maintained in position until the alginate has set. The fish head is then pulled out to obtain a temporary negative mold.

The master die is then prepared with the alginate mold. The mold is coated with thin layer of catalyzed liquid crosslinkable polyester composition. The polyester is prepared by mixing equal amounts of commercially available liquid crosslinkable polyester resin with a commercially available polyester filler paste. The filler paste contains polyester resin, inert filler, e.g. clay, titanium dioxide pigment and styrene monomer. When the mixture is consistent the catalyst, benzoyl peroxide dispersed in plasticizer (distributed by U.S. Chemicals and Plastic, Canton, Ohio), is added in a ratio of 1 part by weight to 16 parts of polyester mixture. Excess resin is allowed to collect in the bottom of the mold. A wire to facilitate removal of the replicated fish head is then inserted into the resin at the bottom of the mold. The resin then hardens. Thereafter additional catalyzed polyester resin is prepared and chopped (approx. ¼ inch, approx. 6 mm long) fiber glass strands are mixed into the resin. The fibrated resin is then applied to the resin layer in the mold and allowed to harden and crosslink. The layer is at least ⅛ inch, 3 mm thick. After curing the master die is removed from the mold and cleaned. Because it is desired to add the glass fish eye after molding the contour of the fish's eye is removed from the master die an eye socket is carved in. The die is now ready to use.

The RTV silicone rubber mold is prepared. The two part RTV silicone and diisocynate crosslinker composition (ADRUB RTV, Adhesive Products Co., Bronx, N.Y.) is admixed together to obtain a thick pourable mixture (about 4,00c cps). The master die prepared above is lightly coated with a hydrogenated vegetable oil mold release and inserted into the silicone mixture. The mixture is then cured overnight at room temperature. Afterwards the master die is removed.

Replicated fish heads are then prepared in the RTV silicone mold using catalyzed polyester resin and catalyzed polyester resin/chopped fiber glass mixtures in the method and manner described above. About 5 minutes after the catalyst is added to the resin/glass mixture the mixture becomes very firm but flexible. The replica is then pulled from the mold. The curing (crosslinking) process has a high exotherm or heat of reaction. This heat transfers to the RTV silicone mold, making the mold very flexible and allows the replica to slip out of the mold without damage to the mold.

The excess resin and fiber glass is then trimmed from the replica. Appropriate teeth are added to the replica by the use of a liquid polyester resin containing calcium silicate and benzoyl peroxide. Glass eyes are then glued or wired to the replica. The replica is now ready for use in mounting a fish for display according to usual taxidermy methods. Basically, the fish's skin is carefully removed from the body, cleaned, and then mounted on a form appropriate for that fish's size and type. Then the molded head is attached and cosmetic details attended to.

The above procedure is repeated. However, this time the fish is a salmon. A replica suitable for taxidermy use is obtained.

The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention is which an exlcusive property or privilege is claimed are defined as:

1. A process for preparing quantities of a realistic artificial fish head having interior mouth detail for taxidermy purposes comprising
   A. To the surface of a previously prepared room temperature vulcanizing silicone rubber composition one piece mold for fish heads, said mold being prepared by
      (a) inserting into a container containing a room temperature vulcanizable silicone rubber composition a fish head master for such a depth that at least the entire length of the head of said fish head master is below the surface of said composition,
      (b) polymerizing said composition, and
      (c) removing said fish head master to obtain a permanent mold for molding fish heads
      Applying a thin coating of a catalyzed cross linkable liquid polymer and allowing it to solidify, said catalyst being present in an amount sufficient to achieve rapid crosslinking of all the polymer,
   B. Applying a layer of said catalyst crosslinkable liquid polymer containing strands of fiber glass, and
   C. While said mold still contains a substantial amount of the heat generated by said crosslinking removing the resulting fish head from said mold.

2. The process of claim 1 wherein the fish head master is prepared by
   A. Inserting the head of a fish into an open container having a bottom which is permanently affixed to the sides of said container filled with alginate molding composition to such a depth that the head of the fish is completely immersed in said alginate,
   B. Allowing said alginate to reach the state of shape retaining and then removing said head to obtain a mold with the negative of said fish head, and
   C. Forming with crosslinkable liquid polymer a solid positive image in said mold and then removing the resulting fish head master from said mold.

3. In the process of claim 1 after said mold has been modified at each eye portion to provide therein an eye socket inserting and positioning an artificial glass fish eye into each eye socket portion of the mold prior to the coating of said mold surfce with said catalyzed crosslinkable liquid polymer.

4. The process of claim 1 wherein artificial glass fish eyes are attached to said fish head after its removal from said mold.

5. The process of claim 1 wherein a wire handle for removal of the fish head being prepared is embedded in the catalyzed cross linkable liquid polymer containing strands of fiber glass.

6. A taxidermically prepared fish wherein the head of said fish having interior mouth detail is prepared by
   A. To the surface of a previously prepared room temperature vulcanizlng silicone rubber composition one piece mold for fish heads, said mold being prepared by
      (a) inserting into a container containing a room temperature vulcanizable silicone rubber composition a fish head master for such a depth that at least the entire length of the head of said fish head master is below the surface of said composition,
      (b) polymerizing said composition, and
      (c) removing said fish head to obtain a permanent mold for molding fish heads
      Applying a thin coating of a catalyzed cross linkable liquid polymer and allowing it to solidify, said catalyst being present in an amount sufficient to achieve rapid crosslinking of all the polymer,
   B. Applying a layer of said catalyzed cross linkable liquid polymer containing strands of fiber glass, and
   C. While said mold still contains a substantial amount of the heat generated by said crosslinking removing the resulting fish head from said mold.

7. The taxidermically prepared fish of claim 6 wherein said fish head master is prepared by
   A. Inserting the head of a fish into a container of alginate molding composition to such a depth that the head of the fish is completely immersed in said alginate,
   B. Allowing said alginate to reach the state of shape retaining and then removing said head to obtain a mold with the negative of said fish head, and
   C. Forming with crosslinkable liquid polymer a solid positive image in said mold and then removing the resulting fish head master from said mold.

8. The taxidermically prepared fish head of claim 6 wherein a wire handle for removal of the fish head being prepared is embedded in the catalyzed cross linkable liquid polymer containing strands of fiber glass.

* * * * *